United States Patent

Divecha et al.

[11] Patent Number: 5,100,049
[45] Date of Patent: Mar. 31, 1992

[54] METHOD OF BONDING CARBON-CARBON AND METAL MATRIX COMPOSITE STRUCTURES

[75] Inventors: Amarnath P. Divecha, Falls Church; William A. Ferrando, Arlington, both of Va.; Philip W. Hesse, Ellicott City, Md.; Subhash D. Karmarkan, Great Falls, Va.

[73] Assignee: The United States of America as represented by the Secretary of the Navy, Washington, D.C.

[21] Appl. No.: 724,084

[22] Filed: Jul. 1, 1991

[51] Int. Cl.$^5$ ............................................. B23K 28/00
[52] U.S. Cl. .................................. 228/198; 228/124; 228/194; 228/263.12
[58] Field of Search .............. 228/121, 124, 198, 194, 228/263.12, 209

[56] References Cited

U.S. PATENT DOCUMENTS

| | | | |
|---|---|---|---|
| 2,920,385 | 1/1960 | Fike | 228/121 |
| 3,482,305 | 12/1969 | Dockus | 228/194 |
| 4,610,934 | 9/1986 | Boecker | 228/263.12 |
| 4,958,763 | 9/1990 | Divecha | 228/193 |
| 4,978,054 | 12/1990 | Ferrando | 228/124 |
| 4,980,123 | 12/1990 | Gedeon | 164/75 |

*Primary Examiner*—Richard K. Seidel
*Assistant Examiner*—James Miner
*Attorney, Agent, or Firm*—Kenneth E. Walden; Roger D. Johnson

[57] ABSTRACT

A method of bonding two carbon/carbon composite pieces or a carbon/carbon composite piece and a graphite/aluminum metal matrix composite piece together by (1) forming a uniform coating of molten $AgNO_3$ on the surfaces to be bonded at a temperature above the melting point of $AgNO_3$ but below the decomposition temperature of $AgNO_3$;

(2) placing the molten $AgNO_3$ coated surfaces to be bonded into contact with each other;

(3) decomposing the molten $AgNO_3$ to form a silver metal layer bonding the pieces together.

If a graphite/aluminum metal matrix composite piece is being bonded, a silver diffusion step may be added at the end of the process to strengthen the silver bond to the metal cladding or metal matrix of the metal matrix composite piece.

16 Claims, No Drawings

METHOD OF BONDING CARBON-CARBON AND METAL MATRIX COMPOSITE STRUCTURES

BACKGROUND OF THE INVENTION

This invention relates to carbon composites and more particularly to methods of bonding carbon composite pieces.

There is an acute need for new methods of joining carbon/carbon, and graphite/aluminum (Gr/Al) composites. The methods used today are bonding with epoxies, diffusion bonding, ceramic adhesives, and fusion welding. In each method the joints are poor in that there is porosity, degradation of the carbon or graphite fiber, reaction with the matrix, and heat affected zones (HAZ) not conducive to good performance. For example, epoxies used to bind carbon/carbon break down at about 500° C., well below the temperature limit for carbon and graphite. Another example is the use of diffusion bonding to join Gr/Mg and Gr/Al metal matrix composites (MMC's). At present, diffusion bonding is the only conventional process capable of joining those MMC's together. However, diffusion bonding, which requires long times at high temperatures under high pressures in an inert environment, is not ideal because of the tendency of graphite to react with the magnesium or aluminum matrix under long exposures. Moreover, if a tubular joint is to be made, the difficulty of diffusion bonding is much greater than flats due to the need to devise special dies needed to adequately apply the pressure on a tube curvature.

Finally, it would be useful to provide a method of producing good bonds between carbon/carbon composites and graphite/aluminum composites.

SUMMARY OF THE INVENTION

Accordingly, an object of this invention is to provide a new method of bonding a carbon/carbon composite piece to another carbon/carbon composite piece.

A further object of this invention is to provide a method of bonding a carbon/carbon composite piece to a graphite/aluminum metal matrix composite piece.

These and other objects of this invention are accomplished by providing:

A method of bonding two carbon/carbon composite pieces or a carbon/carbon composite piece and a graphite/aluminum metal matrix composite piece together by (1) forming a uniform coating of molten $AgNO_3$ on the surfaces to be bonded at a temperature above the melting point of $AgNO_3$ but below the decomposition temperature of $AgNO_3$;

(2) placing the molten $AgNO_3$ coated surfaces to be bonded into contact with each other;

(3) decomposing the molten $AgNO_3$ to form a silver metal layer bonding the pieces together.

If a graphite/aluminum metal matrix composite piece is being bonded, a silver diffusion step may be added at the end of the process to strengthen the silver bond to the metal cladding or metal matrix of the metal matrix composite piece.

DETAILED DESCRIPTION OF THE PREFERRED EMBODIMENT

The present invention provides a method of bonding a carbon/carbon composite piece to another carbon/carbon composite piece. It also provides a method of bonding a carbon/carbon composite piece to an aluminum or aluminum alloy matrix composite piece.

When carbon/carbon composite pieces are to be joined, the surfaces to be bonded are coated with molten $AgNO_3$ at a temperature above the melting point of $AgNO_3$ (mp. 212° C.) but below the decomposition temperature (444° C.) of $AgNO_3$. Note that the carbon/carbon composite pieces are also heated at this temperature to prevent the molten $AgNO_3$ from freezing during the coating process. The molten $AgNO_3$ coating is applied to those surfaces on the carbon/carbon composite pieces which are to be bonded together. The molten $AgNO_3$ coating can be applied by dipping, immersion, painting, rolling on, spraying, etc. The molten $AgNO_3$ readily wets the carbon or graphite surface, filling in pores, cracks, and intimately conforming to the carbon/carbon composite surfaces.

Next the molten $AgNO_3$ coated carbon/carbon composite surfaces to be bonded are placed in contact with each other. A gentle or moderate force may be applied to keep the surfaces in contact. The pieces are then heated at temperature of preferably from the decomposition temperature of $AgNO_3$ up to about 700° C., more preferably from 450° C. to 550° C., and still more preferably from 450° C. to 500° C., to decompose the molten $AgNO_3$ to form silver metal. The chemical reactions of this decomposition are

$$2AgNO_3 \rightarrow 2AgO + 2NO_2 \uparrow$$

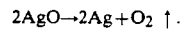

$$2AgO \rightarrow 2Ag + O_2 \uparrow .$$

the silver metal layer that binds the carbon/carbon pieces together also forms in the pores and cracks where the molten $AgNO_3$ had penetrated. As a result a strong bond is formed between the pieces of carbon/carbon composite material by the silver metal layer. The joints which may be formed include lap joints, miter joints, dovetail joints, mortise and tenon joints, etc., with the interlocking joints such as mortise and tenon being preferred.

The metal matrix composites which are bonded by the present method preferably have metal matrices of aluminum or aluminum alloys. The aluminum alloys preferably comprise from 75 to less than 100 and more preferably from 90 to less than 100 weight percent aluminum. The reinforcing materials may be composed of carbon, graphite, silicon carbide, boron nitride, etc., in the form of whiskers, particles, fibers, woven structures, etc., with graphite fibers being more preferred. Usually these metal matrix composites are clad in a thin aluminum metal jacket. The silver metal bond will be attached to the aluminum metal jacket or else to the aluminum or aluminum alloy of the metal matrix if no cladding is used.

When a metal matrix piece is to be joined to a carbon/carbon composite piece, the surfaces to be bonded of both pieces are coated with molten $AgNO_3$ at a temperature above the melting point of $AgNO_3$ (mp. 212° C.) but below the decomposition temperature of $AgNO_3$ (444° C.). Both the carbon/carbon composite piece and the metal matrix composite piece are also heated at this temperature to prevent the molten $AgNO_3$ from freezing during the coating process. The molten $AgNO_3$ coating is applied to those surfaces which are to be bonded together. The molten $AgNO_3$ can be applied any number of conventional procedures such as dipping, immersion, rolling on, painting, spraying, etc. The molten AgNO₃ readily wets the carbon and the metal surfaces and rapidly spreads out to form a uniform layer.

Next the molten AgNO₃ coated metal matrix composite surface to be bonded and the silver are placed in contact with each other. A gentle or moderate force may be applied to keep the surfaces in contact, being careful not to squeeze out the molten AgNO₃ from between the surfaces. The composite pieces are then heated at a temperature of from the decomposition temperature of AgNO₃ up to just below the silver-aluminum eutectic temperature (approximately 566° C.), preferably from 450° C. to 550° C., and more preferably from 450° C. to 500° C. to form a layer of silver metal. The silver metal layer penetrates the pores and cracks of the carbon/carbon composite surface forming a strong bond. The carbon/carbon composite/silver metal/metal matrix structure is then heated at a temperature in the range of from just above the silver-aluminum eutectic temperature up to just below the melting point of any metal or alloy in the metal matrix or cladding. A preferred temperature range is from 570° C. to 625° C., with 570° C. to 600° C. being more preferred. This heating is continued until the silver and aluminum form a suitable interdiffusion layer and thus increase the strength of the bond. This heating step does not affect the carbon/carbon composite/silver metal interface.

Obviously, numerous modifications and variations of the present invention are possible in light of the above teachings. It is therefore to be understood that within the scope of the appended claims the invention may be practiced otherwise than as specifically described herein.

What is claimed is:

1. A method of bonding a carbon/carbon composite piece to another carbon composite piece comprising:
   (1) forming a uniform coating of molten AgNO₃ on the surfaces to be bonded at a temperature above the melting point of AgNO₃ but below the decomposition temperature of AgNO₃;
   (2) placing the molten AgNO₃ coated surfaces to be bonded into contact with each other; and then
   (3) decomposing the molten AgNO₃ at a temperature of from the decomposition temperature of AgNO₃ up to about 700° C. until a silver metal layer bonding the carbon/carbon composite pieces together is formed.

2. The process of claim 1 wherein the molten AgNO₃ is decomposed at a temperature of from about 450° C. to 550° C. in step (3).

3. The process of claim 2 wherein the molten AgNO₃ is decomposed at a temperature of from 450° C. to 500° C. in step (3).

4. A method of bonding a carbon/carbon composite piece to an unclad metal matrix composite piece comprising:
   (1) coating the surface of a carbon/carbon composite piece and the surface of an unclad metal matrix composite piece which are to be bonded together with molten AgNO₃ at a temperature above the melting point of AgNO₃ but below the decomposition point of AgNO₃, wherein the matrix metal of the metal matrix composite piece is aluminum or an aluminum alloy;
   (2) placing the molten AgNO₃ coated surfaces to be bonded into contact with each other;
   (3) decomposing the molten AgNO₃ at a temperature of from the decomposition temperature of AgNO₃ up to just below the silver-aluminum eutectic temperature to form a silver metal layer bonding the carbon composite and metal matrix composite pieces together; and
   (4) heating the carbon/carbon composite/silver metal/metal matrix composite product of step (3) at a temperature from just above the silver-aluminum eutectic temperature to just under the melting point of the matrix metal to diffuse silver metal into the surface of the metal matrix.

5. The method of claim 4 wherein the matrix metal is aluminum.

6. The method of claim 4 wherein the matrix metal is an aluminum alloy which comprises from 75 to less than 100 weight percent of aluminum.

7. The method of claim 6 wherein the aluminum alloy comprises from 90 to less than 100 weight of aluminum.

8. The method of claim 4 wherein the molten AgNO₃ is decomposed in step (3) at a temperature in the range of from 450° C. to 550° C.

9. The method of claim 8 wherein the molten AgNO₃ is decomposed in step (3) at a temperature in the range of from 450° C. to 500° C.

10. The method of claim 4 wherein the silver metal diffusion temperature of step (4) is from 570° C. to 625° C.

11. The method of claim 10 wherein the silver metal diffusion temperature of step (4) is from 570° C. to 600° C.

12. A method of bonding a carbon/carbon composite piece to an aluminum clad metal matrix composite piece comprising:
   (1) coating the surface of a carbon/carbon composite piece and the surface of an aluminum jacket cladding a metal matrix composite piece which are to be bonded together with molten AgNO₃ at a temperature above the melting point of AgNO₃ but below the decomposition point of AgNO₃, wherein the matrix metal of the metal matrix composite piece is aluminum or an aluminum alloy;
   (2) placing the molten AgNO₃ coated surfaces to be bonded into contact with each other;
   (3) decomposing the molten AgNO₃ at a temperature of from the decomposition temperature of AgNO₃ up to just below the silver-aluminum eutectic temperature to form a silver metal layer bonding the carbon composite and metal matrix composite pieces together; and
   (4) heating the carbon/carbon composite/silver metal/metal matrix composite product of step (3) at a temperature from just above the silver-aluminum eutectic temperature to just under the melting point of aluminum to diffuse silver metal into the surface of the aluminum jacket which clads the metal matrix composite piece.

13. The method of claim 12 wherein the molten AgNO₃ is decomposed in step (3) at a temperature of from 450° C. to 550° C.

14. The method of claim 13 wherein the molten AgNO₃ is decomposed in step (3) at a temperature in the range of from 450° C. to 500° C.

15. The method of claim 12 wherein the silver metal diffusion temperature of step (4) is from 570° C. to 625° C.

16. The method of claim 15 wherein the silver metal diffusion temperature of step (4) is from 570° C. to 600° C.

* * * * *